United States Patent [19]

Lenchik et al.

[11] Patent Number: 5,251,327
[45] Date of Patent: Oct. 5, 1993

[54] METHOD AND APPARATUS FOR PROCESSING AUDIO MESSAGES WITHIN A COMMUNICATION SYSTEM

[75] Inventors: Vitaly Lenchik, Lake Zurich; Bhadresh Patel, Des Plaines; Kevin J. Krueger, Palatine; Kevin T. Tenbrunsel, Schaumburg; Brian Stinton, Itasca, all of Ill.

[73] Assignee: Motorola, Inc., Schaumburg, Ill.

[21] Appl. No.: 842,837

[22] Filed: Feb. 27, 1992

[51] Int. Cl.⁵ .................................................. H04B 7/26
[52] U.S. Cl. .................................... 455/54.2; 455/53.1
[58] Field of Search .................. 455/53.1, 54.1, 54.2, 455/34.1, 56.1, 58.1, 33.1; 379/58, 59, 63

[56] References Cited

U.S. PATENT DOCUMENTS

| | | | |
|---|---|---|---|
| Re. 32,789 | 11/1988 | Lynk, Jr. et al. | 455/34.1 |
| 4,788,543 | 11/1988 | Rubin | 455/58.1 |
| 4,941,203 | 7/1990 | Patsiokas et al. | 455/53.1 |
| 4,995,095 | 2/1991 | Lohrbach et al. | 455/9 |
| 5,054,109 | 10/1991 | Blackburn | 455/34.1 |

Primary Examiner—Reinhard J. Eisenzopf
Assistant Examiner—Nguyen Vo
Attorney, Agent, or Firm—Timothy W. Markison; Steven G. Parmelee

[57] ABSTRACT

In a communication system that includes a plurality of communication units, a limited number of communication resources, and at least one operator station, the operator station can monitor audio messages produced by plurality of communication units in the following manner. Upon receiving at least one audio message generated by at least one of the communication units, the console will buffer the received audio message and establish a group of buffered audio messages. From the group of audio messages, the console selects at least one of the buffered audio messages pursuant to a pre-established selection procedure. Once an audio message has been selected it is retrieved and processed to render the audio message audible.

7 Claims, 3 Drawing Sheets

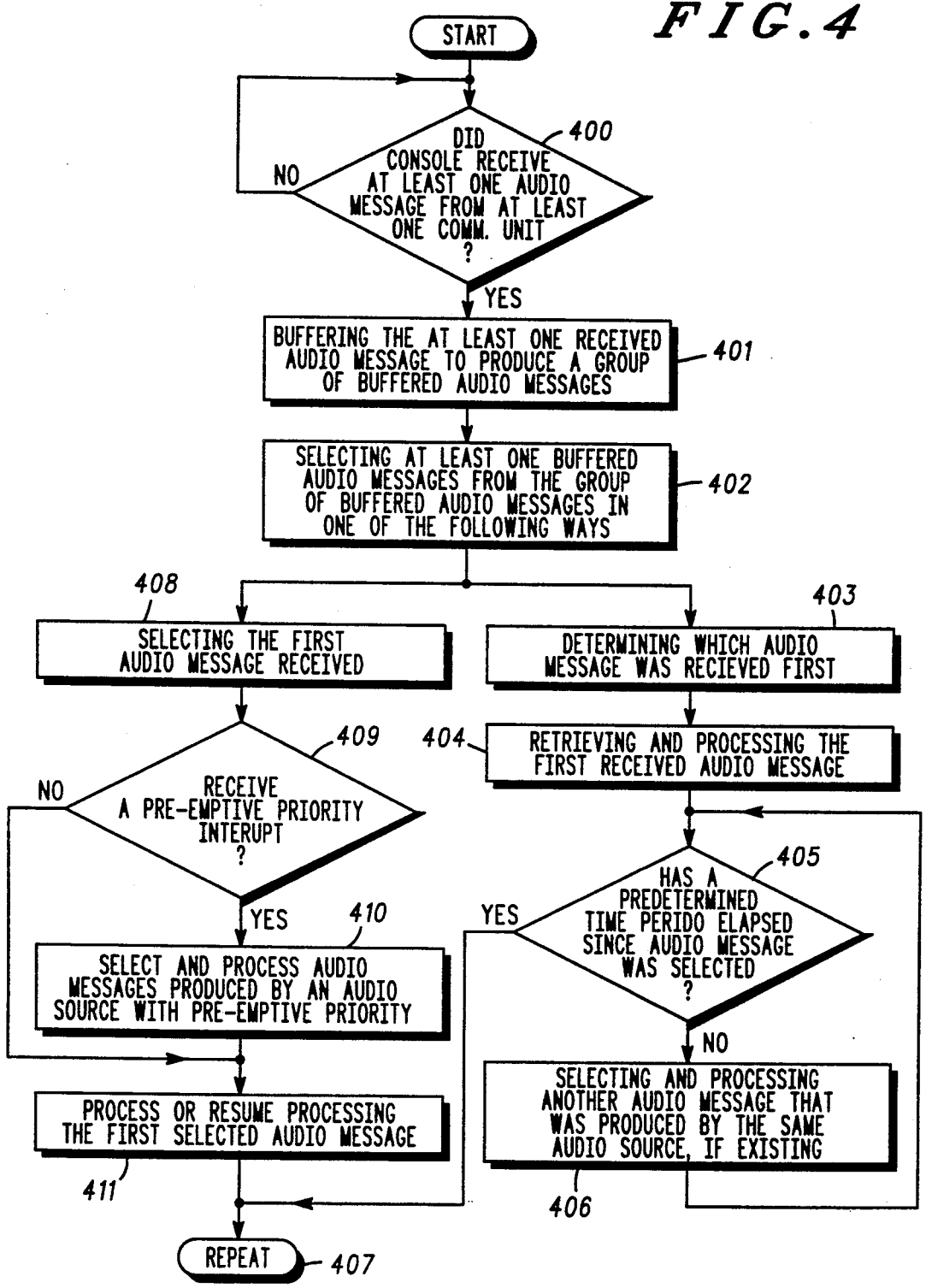

METHOD AND APPARATUS FOR PROCESSING AUDIO MESSAGES WITHIN A COMMUNICATION SYSTEM

FIELD OF THE INVENTION

This invention relates generally to communication systems and in particular to a method and apparatus for processing audio messages by an operator station.

BACKGROUND OF THE INVENTION

Presently, there are two basic types of land mobile communication systems; trunked communication systems and conventional communication systems. Each of these land mobile communication systems comprises a plurality of communication units organized into a number of communication groups, a limited number of communication resources that are transceived via a plurality of base stations, a communication resource allocator, and a plurality of operator stations, or consoles. In either system, communication units may communicate to each other or an operator of an operator station via the communication resources which may be carrier frequencies, frequency pairs, TDM time slots, or voice compressed data time slots. Typically, an operator of a console will monitor communications within a particular communication group whether that communication is directed towards the operator or not. This provides the operator with an ability to monitor and assist any user of a communication unit within the particular communication group.

In many situations, several users of different communication units may be communicating at once. The operator of the console will receive these multiple communications and may have difficulty ascertaining the content of the individual communications. As is well known, when multiple persons are talking it is very difficult to ascertain the information being conveyed by each person. This presents a serious problem for an operator of a console in responding to emergency conditions or the like. Under such circumstances, if the operator is unable to understand the communications due to several users talking at once, the operator will be delayed in responding to the emergency conditions. Thus, there is a need for an improved console that will facilitate an operator's ability to monitor multiple communications.

In addition to an operator of a console having difficulty ascertaining information from multiple communications, consoles are not presently equipped to efficiently handle digitally compressed audio such as Vector Sum Excited Linear Prediction (VSELP). Present technology consoles can accommodate digitally compressed audio, however, a Digital Signal Processor (DSP) is need to process a single communication. Thus, a console would need a DSP for each communication it desired to monitor. At present, a DSP is relatively expensive and incorporation of several DSPs into a console, from a cost standpoint, overshadows the benefits of using digitally compressed audio. Thus, a need exists for a console that will efficiently and economically accommodate digitally compressed audio signals.

SUMMARY OF THE INVENTION

The above described needs and others are substantially met by the method and apparatus for processing audio messages within a communication system disclosed herein. In a communication system that includes a plurality of audio message sources, a limited number of communication resources that carry audio messages, and at least one audio message receiver, the audio message receiver can process audio messages produced by the plurality of audio message sources in the following manner. The audio message receiver receives at least one audio message from at least one audio message source and buffers it to produce a group of buffer messages. The audio message receiver then selects at least one buffered audio message from the group of buffer audio messages pursuant to a pre-established selection procedure and processes the selected audio message to render it audible.

In an aspect of the present invention, a pre-established selection procedure determines which of the at least one audio message was received first. Once it is determined which audio message was received first, that message is selected and processed. Once the audio message is selected, a predetermined period of time is initiated such that any subsequent audio messages produced by the audio message source that produced the first audio message will also be processed. Each time an audio message that was produced by the audio message source that produced the first audio message within the predetermined period of time, the predetermined period of time is reset. Once the predetermined period of time elapses, a sequentially subsequent received audio message will be selected and processed.

BRIEF DESCRIPTION OF THE DRAWINGS

FIG. 4 illustrates a logic diagram which illustrates an implementation of the present invention.

DESCRIPTION OF A PREFERRED EMBODIMENT

Figure 1:
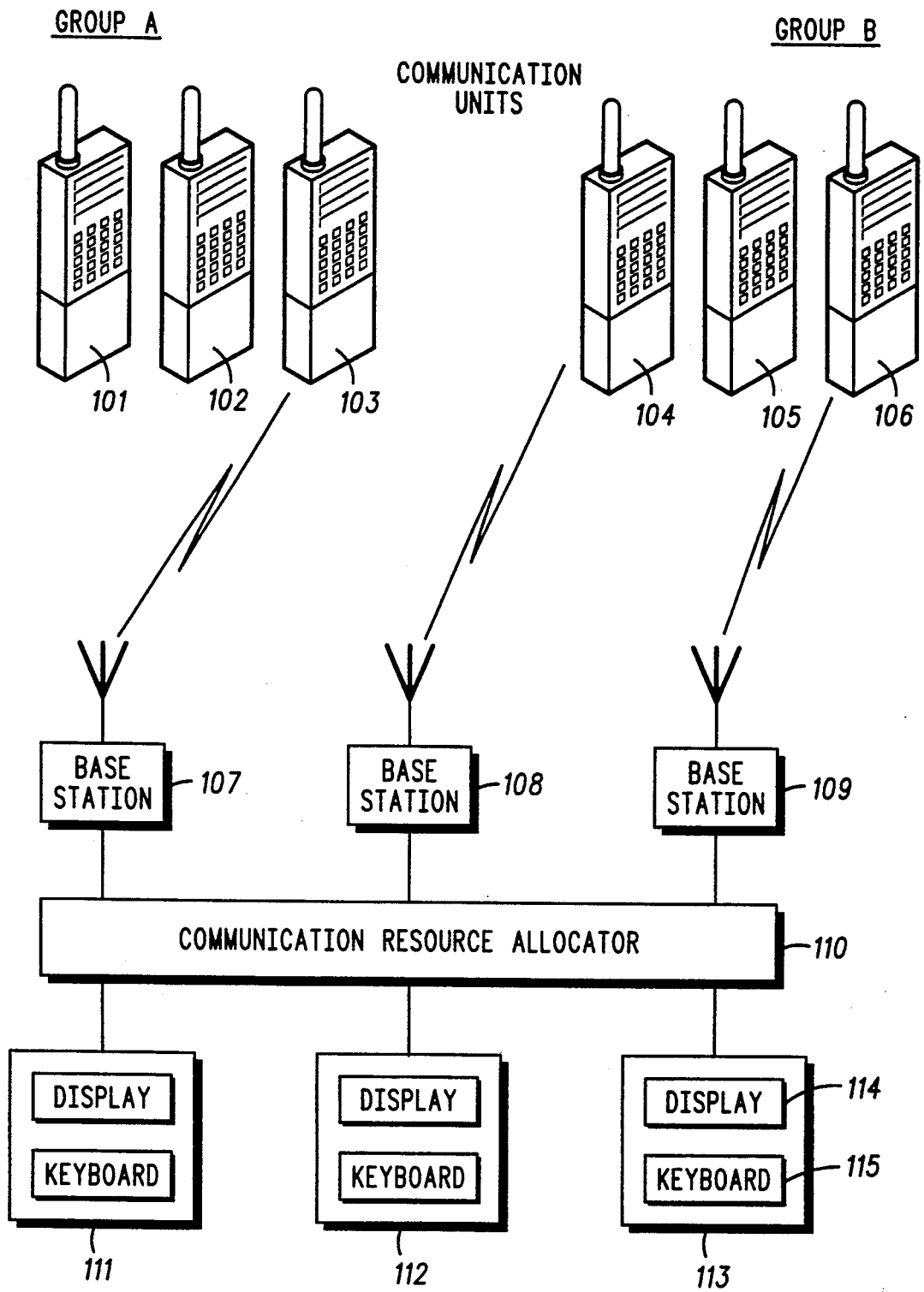
FIG. 1 illustrates a communication system that may incorporate the present invention.

FIG. 1 illustrates a communication system 100 that comprises a plurality of communication units 101-106, a plurality of base stations 107-109, a communication resource allocator 110, and a plurality of consoles 111-113. The communication units are divided into communication groups. It is generally known that a communication system can support hundreds and even thousands of communication groups, however, for illustrative purposes, only two communication groups are shown; group A comprising communication units 101-103 and group B comprising communication units 104-106. These communication units may be portable radios or vehicle mounted radios as manufactured by Mororola, Inc.

Consoles 111-113 are equipped to provide communication group monitoring capabilities, selection means, and volume adjustment means as described in Motorola Inc. Publication #R4-2-37C, CENTRACOM Series II Control Centers which is incorporated herein by reference. The consoles 111-113 may also comprise a display 114 and a keyboard 115. However, the display and keyboard are not essential to the operation of this invention and a typical console which does not include a display or keyboard may support the present invention as well.

The communication units 101-106 communicate with each other and an operator of a console via communication resources (not shown) which are transceived by the base stations 107-109. If the communication units are transmitting their audio via a digitally compressed audio scheme such as VSELP, the recipient of the audio message will need to include decompression circuitry. The concept of VSELP is discussed in a paper presented at the Int. Conf. on Acoustics and Signal Processing, April 1990 entitled Vector Sum Excited Linear Prediction (VSELP) Speech Coding at 8KBPS, by Ira A. Gerson and Mark A. Jasiuk both of Motorola Inc. which is incorporated herein by reference and attached as an Appendix.

Figure 2:
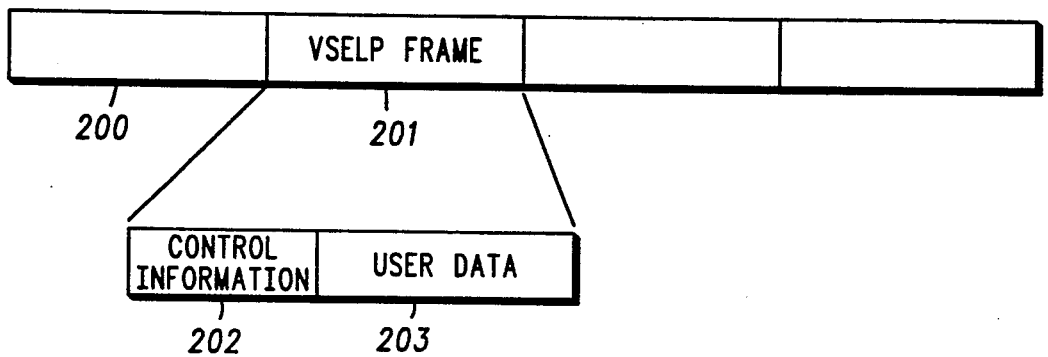
FIG. 2 illustrates a plurality of VSELP frame. information contained within a VSELP frame.

FIG. 2 illustrates a plurality of VSELP frames 200, an individual VSELP frame 201 and the contents thereof: control information 202 and user data 203. Each VSELP frame 201 stores a discrete segment of speech which may hold anywhere from 30 milliseconds of speech to 90 milliseconds of speech. As is generally known with digitally compressed audio signals such signals cannot be summed directly without prior decompression. This type of decompression is quite costly and the resulting voice quality may be inferior to analog systems. This makes it even more difficult for an operator or dispatcher who is trying to discern one important conversation from many others which may be less important. In order to overcome this, the diagram of FIG. 3 may be incorporated into a console to alleviate this problem.

Figure 3:
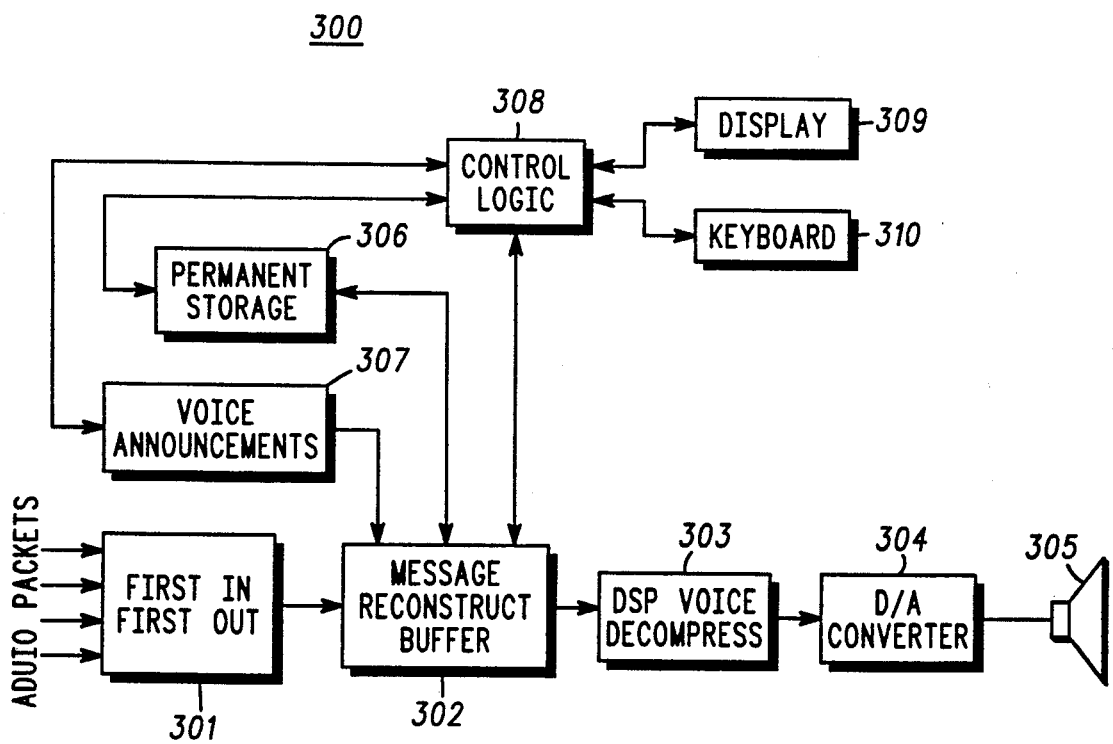
FIG. 3 illustrates an apparatus which may be incorporated into a console to perform the present invention.

FIG. 3 illustrates an improved console 300 comprising a first in first out buffer (FIFO) 301, a message reconstruction buffer 301, a DSP voice decompressor 303, a D to A converter 304, a speaker 305, a permanent storage element 306, a voice announcement storage element 307, controller logic 308, and may also include a display 309 and keyboard 310. The improved console 300 operates by receiving audio packets from the communication resource allocator 110 into the FIFO buffer 301. Note that the coupling between the console and the communication resource allocator may be a direct linkage or it may be an Ethernet linkage. The FIFO buffer 301, which may be a parallel to serial shift computer or similar device, organizes the VSELP frames into a single serial string. The FIFO buffer 301 may also time stamp the received VSELP frames in order to reconstruct the history of the transaction. This may be done by use of an internal clock and having available storage space in the permanent storage element 306.

Once the FIFO buffer 301 organizes the VSELP frames into a single serial string they are serially passed to the message reconstruction buffer 302. The message reconstruction buffer, which may be a memory device such as RAM or the like, reorganizes the voice packets into contiguous talk spurts. This is accomplished under the control of the controller logic 308 which may be a microprocessor. Once the messages have been reconstructed, the controller logic 308, based on some pre-established selection process, discussed below, selects a particular message to be routed to the speaker via the DSP voice decompressor 303 and the D to A converter 304. Thus, the selected message is processed by the DSP voice decompressor 303 which decompresses the audio message in to a PCM code or sixteen bit linear code. The PCM code or sixteen bit linear code is converter by the D to A converter 304 in to an analog signal and rendered audio by the speaker 305.

The permanent storage 306, which may be a RAM, magnetic disk, reel to reel tape or any means of storing digital information, is activated by the controller logic 308 to store each of the received messages to create a permanent record of the audio messages received. The voice announcements storage 307, which also may be a RAM or any other medium for storing digital information, stores pre-established audio messages. For example, a pre-established voice message may be "ATTENTION" or "MOBILE ONE", etc. The controller logic 308 controls when a voice announcement is to be inserted and subsequently processed by the DSP voice decompressor 303 and the D to A converter 304. The display 309 and keyboard 310 may facilitate the operator's or dispatcher's ability to control the system and to listen to which particular audio message or voice that he or she desires to hear.

FIG. 4 illustrates a logic diagram which may be implemented into the improved console 300 to perform the present invention. At step 400, the console determines whether it has received at least one audio message from at least one communication unit. If the console did not receive a message it waits until a message is received. Once at least one audio message is received 400, the received audio messages are buffered by the message reconstruction buffer 302 to produce a group of buffered audio messages 401. Once at least one message has been buffered, the process selects an audio message to be routed to the speaker 305, 402. This can be done in a variety of pre-established ways. One pre-established selection procedure is followed by path 403 and another is followed by path 408. Considering path 403 first, the console determines which audio message was received first. After determining which audio message was received, the first audio message is retrieved and processed 404. Once the first audio message has been selected to be processed, a predetermined period of time is initialized.

If the predetermined period of time has not elapsed 405, the console looks for another audio message that has been buffered and was produced by the same communication unit or a communication unit in the same communication group 406. If such an audio message exists, the predetermined period of time is reset and the audio message is selected and processed at step 406. Steps 405 and 406 are repeated in this sequentially subsequent matter as long as an audio message that was produced by a communication unit in the same talk group is received before the predetermined period of time elapses. The predetermined period of time may very from a relatively short period of time, (e.g. several hundred milliseconds) to a relatively long period of time (e.g. several tens of seconds).

If the predetermined period of time elapses before another audio message produced by the same communication unit or a communication unit within the same communication group is selected, the console selects the next sequentially subsequently received audio message that was produced by a communication unit in a different communication group than the communication group of the communication unit that produced the first audio message. For the subsequently received audio message, the console will not use the predetermined period of time.

For example, assume that the first audio message from a first talk group was received at time 0 and has a duration of five seconds and the predetermined period of time was set for 1 second. After the first audio message began transmitting to the console, an audio message from a second talk group was received and buffered. This audio message, which is subsequently received audio message, will be stored. After receiving the first audio message, a second audio message from the first talk group was received before the predetermined period of time expired. (This could mean that the second audio message from the first talk group was received anytime after the first audio message arrived or shortly before the predetermined period of time expired.) The second audio message from the first talk group will be routed to the console's speaker after the first audio message. Once the second audio message is routed to the speaker, the console resets the predetermined period of time. For each audio message from the first talk group that is received before the predetermined period of time expires, it will be routed to the speaker such that the conversation taking place with communication units of the first talk group will be presented to the operator in a coherent manner. The conversation that the operator hears may have delays between the audio messages if an audio message was received after the preceding audio message was completely routed to the speaker, but before the predetermined period of time expired. There will be no delays in the conversation when audio messages are received before the preceding audio message has been completely routed to the speaker.

Once the predetermined period of time expires, the console selects the audio message received from the second talk group. Further assume that, while the audio messages form the first talk group was being routed to the speaker, several other audio messages from the second talk group were received and buffered. For the second talk group conversation, the console will not reset the predetermined period of time. Thus, the second talk group's conversation will be routed to the speaker without delays between each audio message. This will be the case for each conversation that is received while another conversation is being routed to the speaker, i.e. the messages received will not be presented in a real time fashion to the operator. The process will repeat 407 at step 403 only when an audio message is received when there are no audio messages being routed to the speaker or stored in the group of buffered audio messages.

An alternative predetermined selection procedure is followed by path 408 which selects the first audio message received 408. While processing the selected first audio message, the console is constantly monitoring for a preemptive priority interrupt to occur 409. If no such preemptive priority interrupt occurs 409, the process continues to process the first selected audio message and other audio messages as was described above or on a strictly first in first out process. If, however, a preemptive priority interrupt does occur during the processing of a received audio message 409, the processing of that audio message is stopped and the algorithm selects and processes the audio message produced by the communication unit with the preemptive priority step 410. Once the preemptive priority audio message has been processed and any subsequent audio messages that were produced by the communication units with preemptive priority or communication units within the same communication group, the audio message that was being processed when the interruption occurred will be reprocessed 411. Preemptive priority may be granted to a communication group or individual communication unit based on the type of call that's being placed (e.g. an emergency) or the user of the communication unit (e.g. police commissioner, or paramedics).

In addition to performing the above mentioned preselection procedures the console may also be equipped to perform other functions. For example, the console may scan through a plurality of buffered audio messages to determine which one it would like to hear. In a scan procedure, the duration of time a particular conversation is monitored prior to going to the next communication is limited. This limit may be manually varied or automatically adapted to traffic. In case a dispatcher becomes interested in a particular conversation he may let the conversation play through by signalling a scan hold function via a keyboard or other appropriate input means. Anther feature that the console could do is to speed up the messages. In other words, the console could play back the stored messages at a faster rate for example up to twice the speed of normal conversations.

The console could also be adapted with graphic displays of a backlog of conversations, which communication groups have initiated communications that have not been monitored, and other such graphically illustrated communication enhance.

The above has been described with reference to digitally compressed audio signals. However, the present invention may work equally well with non-compressed digital audio signals. In addition, the improved console of FIG. 3 may also include additional DSPs and D to A converters and a summing circuit to sum the signals together such that a dispatcher could monitor a couple of communications simultaneously.

We claim:

1. In a communication system that includes a plurality of audio message sources, a limited number of communication resources that carry audio messages, and at least one audio message receiver, a method for the at least one audio receiver to process audio messages produced by the plurality of audio message sources, the method comprises the steps of:
    a) receiving at least one audio message from at least one audio message source of the plurality of audio message sources to produce at least one received audio message;
    b) buffering the at least one received audio message to produce a group of buffered audio messages;
    c) determining which of the at least one received audio message was received first to produce a first received audio message;
    d) selecting the first received audio message from the group of buffered audio messages after the first audio message has been buffered;
    e) initializing a predetermined period of time when the first received audio message is selected;
    f) selecting, during the predetermined period of time, another buffered audio message from the group of buffered audio messages provided that the another buffered audio message was produced by the audio message source that produced the first audio message;
    g) resetting the predetermined period of time whenever the another buffered audio message has been selected;
    h) retrieving the first received audio message and, when the another audio message was produced by the audio source that produced the first audio message and was selected during the predetermined period of time, retrieving the another audio message to produce at least one retrieved audio message; and i) processing the at least one retrieved audio message to render the at least one retrieved audio message audible.

2. The method of claim 1 further comprises the steps of:
   f1) when the predetermined period of time expires, determining which of the at least one received audio message generated by an audio message source other than the audio message source that produced the first received audio message was received sequentially subsequent to the first received audio meassage; and
   f2) selecting the sequentially subsequent received audio message.

3. The method of claim 1 further comprises:
   f1) when the predetermined period of time expires, determining which of the at least one received audio message generated by an audio message source other than the audio message source that produced the first received audio message has the highest priority to produce a high priority received audio message; and
   f2) selecting the high priority received audio message.

4. The method of claim 1 further comprises:
   j) retrieving a preestablished voice message:
   k) rendering the preestablished voice message audible.

5. In a communication system that includes a plurality of communication units, a limited number of communication resources that are transceived via a plurality of repeaters, a communication resource allocator that allocates the limited number of communication resources among the plurality of communication units, and at least one operator station, wherein the plurality of communication units are arranged in to a predetermined number of talk groups, a method for allowing the at least one operator station to receive audio messages produced by the plurality of communication units, the method comprises the steps of:
   a) receiving at least one audio message from at least one communication unit to produce at least one received audio message;
   b) buffering the at least one received audio to produce a group of buffered audio messages;
   c) determining which of the at least one received audio message was received first to produce a first received audio message;
   d) selecting the first received audio message from the group of buffered audio messages after the first audio message has been buffered;
   e) initializing a predetermined period of time when the first received audio message is selected;
   f) selecting, during the predetermined period of time, another buffered audio message produced by the communication unit that provided the first received audio message or another communication unit in the same talk group as the communication unit that provided the first received audio message from the group of buffered audio messages; and
   g) resetting the predetermined period of time whenever the another buffered audio message has been selected.
   h) retrieving the first received audio message and, when the another buffered audio message was produced by the communication unit that provided the first received audio message or another communication unit in the same talk group as the communication unit that provided the frist received aduio message and was selected during the predetermined period of time, retrieving the another audio message to produce at least one retrieved message;
   e) processing the at least one retrieved audio message to render the at least one retrieved audio message audible.

6. The method of claim 5 further comprises the steps of:
   f1) when the predetermined period of time expires, determining which of the at least one received audio message generated by a communication unit in a different talk group than the communication unit's talk group was received sequentially subsequent to the first received audio message; and
   f2) selecting the sequentially subsequent received audio message.

7. The method of claim 5 further comprises:
   f1) when the predetermined period of time expires, determining which of the at least one received audio message generated by a communication unit in a different talk group than the communication unit's talk group has the highest priority to produce a high priority received audio message; and
   f2) selecting the high priority received audio message.

* * * * *